United States Patent
Sakaguchi et al.

(10) Patent No.: US 10,598,505 B2
(45) Date of Patent: Mar. 24, 2020

(54) TRAVEL ROUTE GENERATION APPARATUS AND METHOD FOR GENERATING TRAVEL ROUTE

(71) Applicant: Kubota Corporation, Osaka-shi (JP)

(72) Inventors: Kazuo Sakaguchi, Amagasaki (JP); Megumi Suzukawa, Amagasaki (JP); Sakura Tomita, Amagasaki (JP); Yuji Okuyama, Amagasaki (JP)

(73) Assignee: KUBOTA CORPORATION, Osaka-Shi (JP)

( * ) Notice: Subject to any disclaimer, the term of this patent is extended or adjusted under 35 U.S.C. 154(b) by 300 days.

(21) Appl. No.: 15/620,838

(22) Filed: Jun. 13, 2017

(65) Prior Publication Data

US 2018/0164117 A1 Jun. 14, 2018

(30) Foreign Application Priority Data

Dec. 14, 2016 (JP) .................................. 2016-242204

(51) Int. Cl.
*G01C 21/36* (2006.01)
*B60K 35/00* (2006.01)
(Continued)

(52) U.S. Cl.
CPC ........ *G01C 21/3611* (2013.01); *A01B 69/008* (2013.01); *B60K 35/00* (2013.01); *G05D 1/0219* (2013.01); *G06F 3/04883* (2013.01); *G06K 9/00402* (2013.01); *G06K 9/00476* (2013.01); *G06K 9/00483* (2013.01); *G06Q 50/02* (2013.01); *B60K 2370/1438* (2019.05); *G05D 2201/0201* (2013.01); *G06F 3/0482* (2013.01)

(58) Field of Classification Search
None
See application file for complete search history.

(56) References Cited

U.S. PATENT DOCUMENTS 9,538,702 B2 *  1/2017  Balutis .................. B25J 9/0081
9,795,074 B2 * 10/2017  Stratton ............... A01B 69/008
(Continued)

FOREIGN PATENT DOCUMENTS

| JP | 10-243708   | 9/1998  |
|----|-------------|---------|
| JP | 2015-167562 | 9/2015  |
| JP | 2015-173630 | 10/2015 |

OTHER PUBLICATIONS

Extended European Search Report for corresponding EP Application No. 17001060.7-1958, dated Aug. 22, 2017.

*Primary Examiner* — Dale W Hilgendorf
*Assistant Examiner* — Alexander C. Bost
(74) *Attorney, Agent, or Firm* — Mori & Ward, LLP

(57) ABSTRACT

A travel route generation apparatus includes a work field data input interface, a handwriting input interface, a memory, and circuitry. Work field data are to be input via the work field data input interface. The work field data includes data regarding a shape of a work field in which a work vehicle is to work. A handwriting locus is to be input via the handwriting input interface. The memory is to store travel route patterns. The circuitry is configured to select a designated travel route pattern from travel route patterns based on the handwriting locus and to generate, based on the designated travel route pattern and the work field data, a travel route along which the work vehicle is to travel in the work field.

18 Claims, 6 Drawing Sheets

(51) Int. Cl.
*G06K 9/00* (2006.01)
*G06F 3/0488* (2013.01)
*G05D 1/02* (2020.01)
*A01B 69/04* (2006.01)
*G06Q 50/02* (2012.01)
*G06F 3/0482* (2013.01)

(56) References Cited

U.S. PATENT DOCUMENTS

| | | | |
|---|---|---|---|
| 10,180,328 B2 * | 1/2019 | Matthews | G05D 1/0297 |
| 10,289,206 B2 * | 5/2019 | Yuen | G06F 3/017 |
| 2006/0175541 A1 * | 8/2006 | Eglington | G05D 1/0221 |
| | | | 250/221 |
| 2011/0022308 A1 * | 1/2011 | Britton | G01C 21/3664 |
| | | | 701/533 |
| 2015/0016726 A1 | 1/2015 | Sugiura et al. | |
| 2016/0021813 A1 * | 1/2016 | Matthews | A01B 79/005 |
| | | | 701/26 |
| 2017/0318732 A1 * | 11/2017 | Yamashita | G01C 21/26 |
| 2019/0227561 A1 * | 7/2019 | Hiramatsu | A01B 69/008 |

* cited by examiner

TRAVEL ROUTE GENERATION APPARATUS AND METHOD FOR GENERATING TRAVEL ROUTE

CROSS-REFERENCE TO RELATED APPLICATIONS

The present application claims priority under 35 U. S. C. § 119 to Japanese Patent Application No. 2016-242204, filed Dec. 14, 2016. The contents of this application are incorporated herein by reference in their entirety.

BACKGROUND OF THE INVENTION

Field of the Invention

The present invention relates to a travel route generation apparatus and a method for generating a travel route.

Discussion of the Background

The travel route creation apparatus for a work vehicle disclosed in Japanese Patent Application Laid-open No. H10-243708 includes a travel data creation section that creates data of a planned travel route for causing the work vehicle to travel in a field based on measurement information of a work field shape measurement section that measures a three-dimensional shape of the field in which the work vehicle travels. This travel data creation section forms, as a planned travel route, a plurality of work routes adjacently arranged in parallel and separated at set intervals in the field, a so-called work route for straight reciprocating traveling obtained by combining straight routes and U-turn routes. Thus, as another form of the travel route creation apparatus that forms a plurality of work routes adjacently arranged in parallel and separated at set intervals in the work field, a travel route creation apparatus has also been proposed that forms a work route for performing sequential work and travel while making a 90-degree direction change along outer four sides of a rectangular work field, a so-called work route for circumference traveling.

Japanese Patent Application Laid-open No. 2015-173630 discloses a technology in which, when two desired points are depressed and input on a touch panel-type input section that displays map information, whereby positions of the two points are specified, a virtual guidance course generation unit generates a straight reference line that links the two points specified on the input section, and generates a reference route separated at predetermined intervals on the basis of the generated reference line. Moreover, on the basis of the generated reference route, a singular or a plurality of virtual guidance courses with a work width that is set according to a work section linked to a vehicle body being regular intervals are generated as a target travel route.

SUMMARY OF THE INVENTION

According to one aspect of the present invention, a travel route generation apparatus includes a work field data input interface, a handwriting input interface, a memory, and circuitry. Work field data are to be input via the work field data input interface. The work field data includes data regarding a shape of a work field in which a work vehicle is to work. A handwriting locus is to be input via the handwriting input interface. The memory is to store travel route patterns. The circuitry is configured to select a designated travel route pattern from the travel route patterns based on the handwriting locus and to generate, based on the designated travel route pattern and the work field data, a travel route along which the work vehicle is to travel in the work field.

According to another aspect of the present invention, a method for generating a travel route includes inputting a handwriting locus. A designated travel route pattern is selected from travel route patterns stored in a memory based on the handwriting locus. A travel route along which the work vehicle is to travel in the work field is generated based on the designated travel route pattern and work field data including data regarding a shape of a work field in which a work vehicle is to work.

According to further aspect of the present invention, a travel route generation apparatus includes work field data input means, handwriting input means, storing means, pattern selecting means, and travel route generating means. Work field data are to be input via the work field data input means. The work field data includes data regarding a shape of a work field in which a work vehicle is to work. A handwriting locus is to be input via the handwriting input means. The storing means are for storing travel route patterns. The pattern selecting means are for selecting a designated travel route pattern among the travel route patterns based on the handwriting locus. The travel route generating means are for generating, based on the designated travel route pattern and the work field data, a travel route along which the work vehicle is to travel in the work field.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
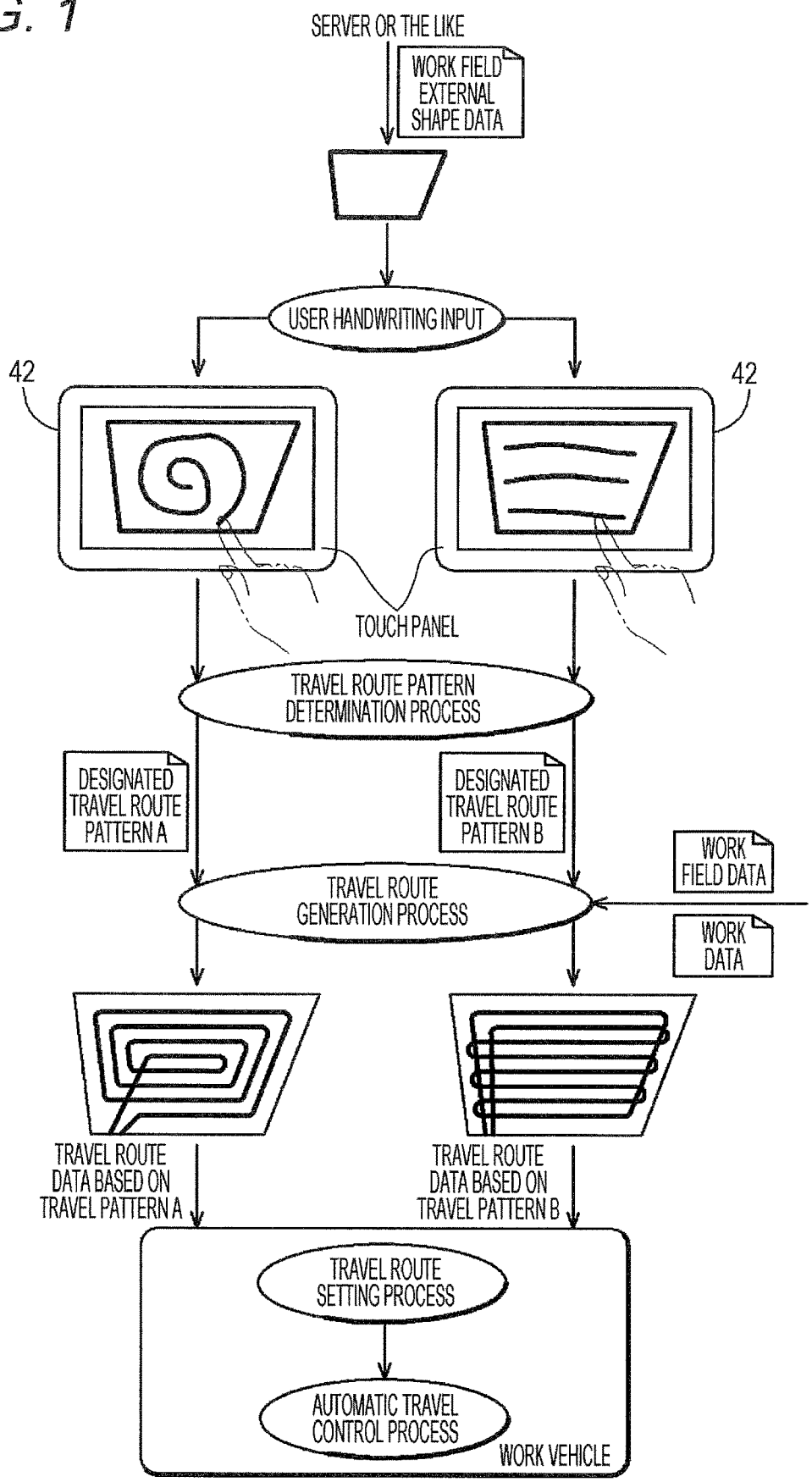
FIG. 1 is an illustrative diagram illustrating a process flow in a travel route generation apparatus according to an embodiment of the present invention.

The embodiments will now be described with reference to the accompanying drawings, wherein like reference numerals designate corresponding or identical elements throughout the various drawings.

FIG. 1 schematically illustrates a basic process flow in a travel route generation apparatus according to an exemplary embodiment of the present invention. When work field data included in work field information downloaded from a server or the like, in particular, external shape data of the work field is input, an external contour line of the work field external shape based on this external shape data is developed in a memory, and this external contour line is displayed on a touch panel 42 (a handwriting input interface). Note that when the external shape data are not included, it is also possible to create the external shape data from the work field data, which is map information. A user handwrites a desired travel route image in a region inside the external contour line. For example, when the user desires a spiral travel pattern of spirally traveling from the center toward the outer circumference of the work field, the user handwrites a spiral as illustrated in the left touch panel 42 of FIG. 1. Alternatively, when the user desires a straight movement reciprocating travel pattern including repeated straight movement and U-turn, which is often used for tilling work and reaping and harvesting work in a field, the user handwrites a plurality of straight-line rows as illustrated in the right touch panel 42 of FIG. 1.

With a travel route pattern determination process, a handwritten locus is detected from handwritten input data, and a travel route pattern that agrees with the detected handwritten locus is extracted from among a group of travel route patterns, as a designated travel route pattern. The designated travel route pattern is used for a travel route generation process. With a travel route generation process, a travel route corresponding to the designated travel route pattern is generated on the basis of the designated travel route pattern, the work field data including the external shape, entrance, or the like of the work field, and work data including a work width, appropriate turning radius, or the like.

The travel route generated with the travel route generation process is set as a target travel route in a control system of a work vehicle. When the work vehicle travels automatically, the work vehicle is automatically steered to align an own position with the target travel route. When the work vehicle travels manually, the target travel route and the own position are displayed on a display to support the driver's steering.

Figure 2:
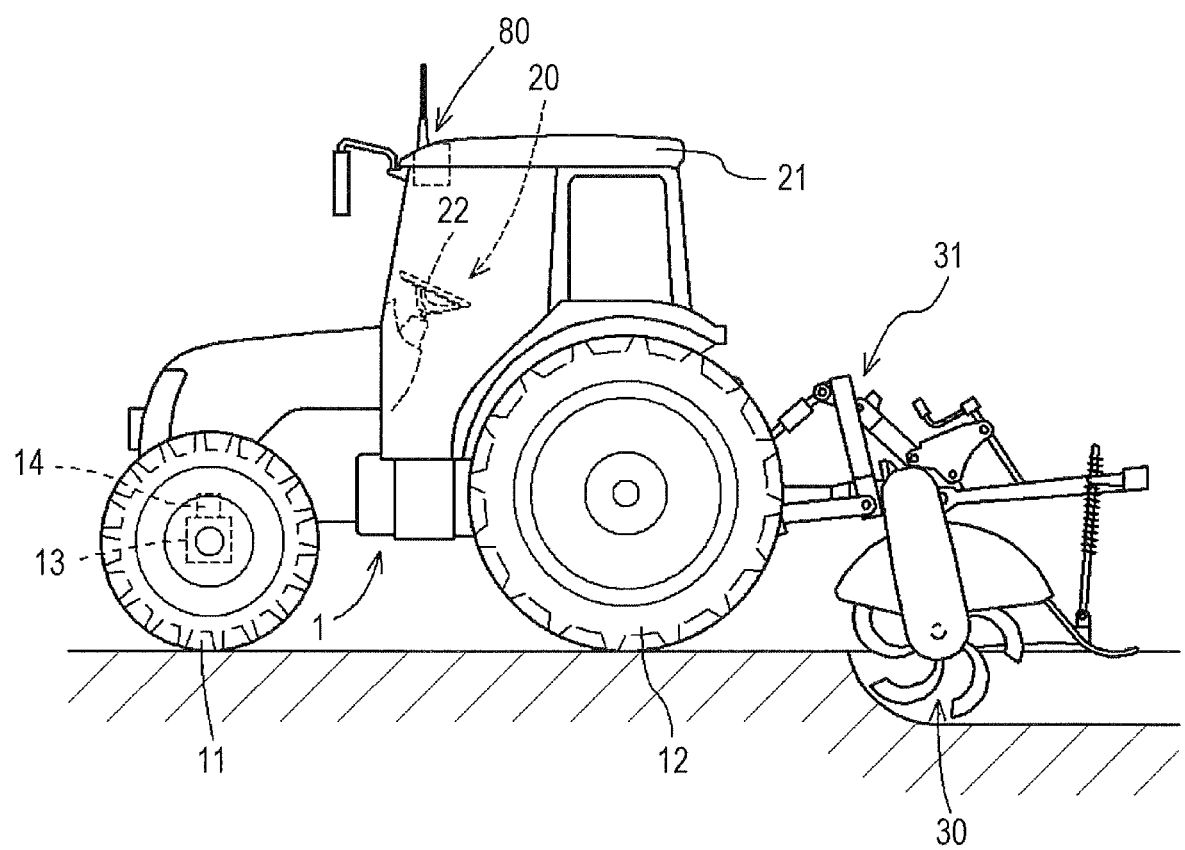
FIG. 2 is a side view of a tractor, one example of a work vehicle that performs manned or unmanned travel on the basis of a travel route generated by the travel route generation apparatus.

FIG. 2 illustrates a tractor which is one example of the work vehicle that is manned-operated or unmanned-operated on the basis of the travel route generated by the travel route generation apparatus. This tractor is equipped with a rotary tilling machine that performs tilling work in a field (work field) separated by ridges as boundaries, as a work device 30. This tractor is provided with an operation unit 20 at the center of a vehicle body 1 supported by front wheels 11 and rear wheels 12. At a rear of the vehicle body 1, the work device 30 is liftably supported via a hydraulic lifting mechanism 31. The front wheels 11 function as steering control wheels through which the tractor changes a travel direction when a steering angle of the steering control wheels is changed. The steering angle of the front wheels 11 is changed by an operation of a steering mechanism 13. The steering mechanism 13 includes a steering motor 14 for automatic steering. For manual traveling, the front wheels 11 can be steered by operating a steering wheel 22 disposed on the operation unit 20. In a cabin 21 of the tractor, a satellite positioning module 80 configured as a GNSS module or a GPS module is provided. As components of the satellite positioning module 80, a satellite antenna for receiving GPS signals or GNSS signals is attached at a ceiling area of the cabin 21. Note that the satellite positioning module 80 may include an inertial navigation module incorporated with a gyro acceleration sensor and a magnetic director sensor for complementing satellite navigation. Of course, the inertial navigation module may be provided in a different location from the location of the satellite positioning module 80.

Figure 3:
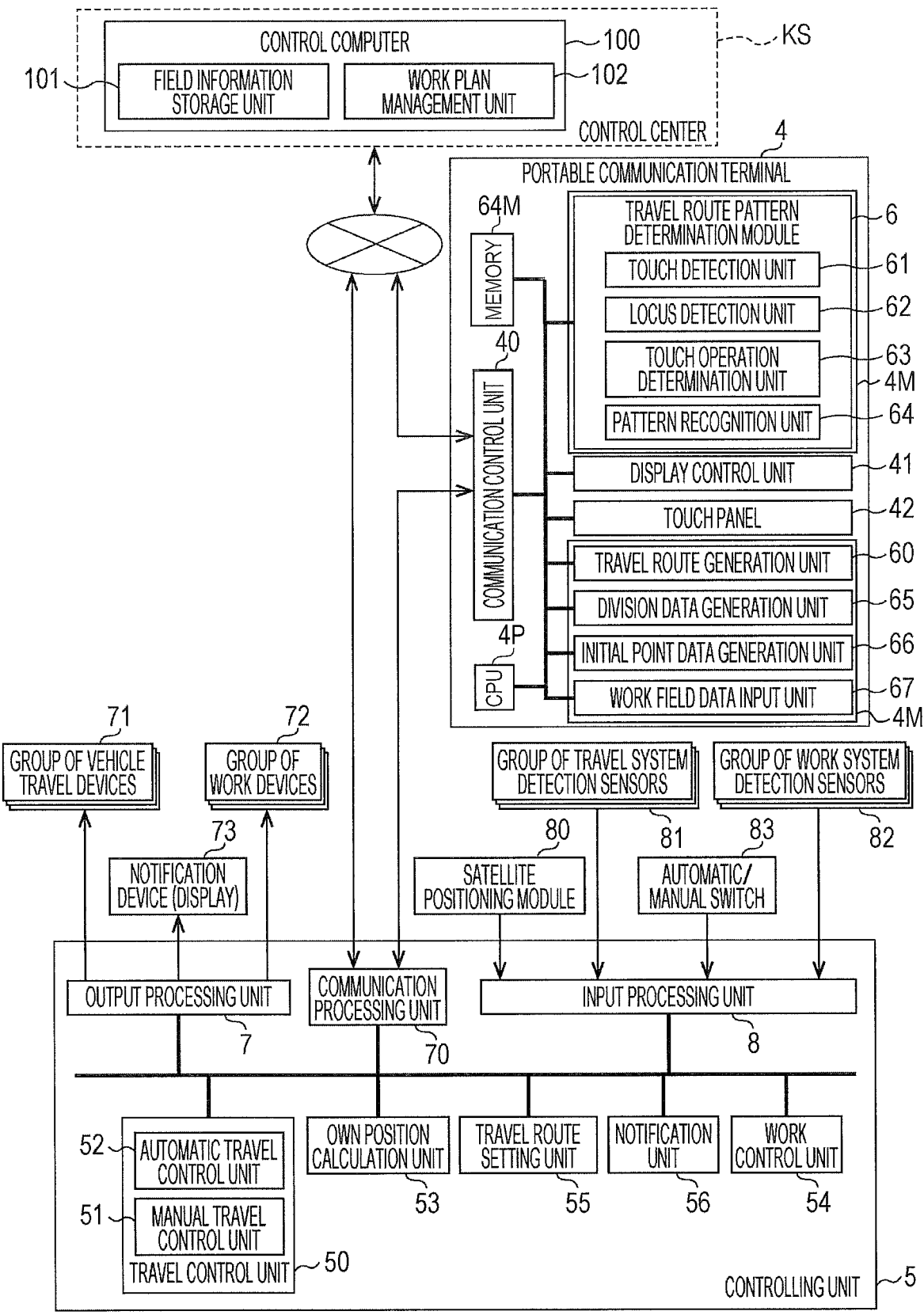
FIG. 3 shows a structure of the travel route generation apparatus according to the embodiment of the present invention.

FIG. 3 illustrates a control system configured in this tractor, and a control system of a portable communication terminal 4 carried by a supervisor (driver) supervising movement of this tractor. In this exemplary embodiment, this portable communication terminal 4 includes a structure to include a computer program to perform the function of the travel route generation apparatus. In this exemplary embodiment, the travel route generation apparatus configured in this portable communication terminal 4 includes a travel route generation unit 60, a work field data input unit 67, a travel route pattern determination module 6, a division data generation unit 65, and an initial point data generation unit 66. That is, the portable communication terminal 4 includes a central processing unit (CPU) 4*p* (circuitry 4*p*) and a memory 4M which is preferably a non-volatile memory. Programs of the travel route generation unit 60, the work field data input unit 67, the travel route pattern determination module 6, the division data generation unit 65, and the initial point data generation unit 66 are stored in the memory 4M and executed by the CPU 4*p* to perform functions of the travel route generation unit 60, the work field data input unit 67, the travel route pattern determination module 6, the division data generation unit 65, and the initial point data generation unit 66, respectively.

In addition thereto, the portable communication terminal 4 has functions of a general computer system, such as a communication control unit 40, a display control unit 41, and the touch panel 42. For example, the communication control unit 40 includes a communication interface to be installed in the portable communication terminal 4, and the display control unit 41 includes a video card and/or a graphic accelerator to be installed in the portable communication terminal 4. The portable communication terminal 4 can be coupled to a controlling unit 5, which is a core element of the control system of the tractor, in such a manner that the portable communication terminal 4 can exchange data by wireless communications or cable communications. Furthermore, the portable communication terminal 4 can exchange data with a control computer 100 configured in a remote control center KS via a wireless channel or the Internet. In this exemplary embodiment, field information including a topographic map of the field as a work field and attribute information of the field is stored in a field information storage unit 101 of the control computer 100, and this field information is needed for generation of travel routes. The control computer 100 also includes a work plan management unit 102 that manages a work plan that describes traveling work in a specified field. The portable communication terminal 4 accesses the control computer 100 with the communication control unit 40 (a work field data input interface), and extracts and downloads, from the field information storage unit 101, the field information on the field in which work is performed. The downloaded field information is provided to the work field data input unit 67.

The work field data input unit 67 extracts the external shape data from the provided field information, and provides the external shape data to functional units that need the external shape data, such as the display control unit 41 and the travel route generation unit 60. The travel route generation unit 60 generates the travel route corresponding to the designated travel route pattern on the basis of the designated travel route pattern designated by the user via the travel route pattern determination module 6, with reference to the external shape data provided from the work field data input unit 67 and tractor specifications such as a work width, turning radius, and the like.

The travel route pattern determination module 6 determines the designated travel route pattern from the desired travel route image that is input by the user by handwriting using the touch panel 42. In this exemplary embodiment, the travel route pattern determination module 6 includes a touch detection unit 61, a locus detection unit 62, a touch operation determination unit 63, and a pattern recognition unit 64. The touch detection unit 61 successively detects coordinates of a depressed point on the touch panel 42, and provides the detected coordinates to the locus detection unit 62. The locus detection unit 62 detects the handwritten locus that is input by the user from successive movement of the depressed point, converts the detected locus into vector data or bit map data, and records the converted data in a memory. Note that the locus detection unit 62 regards the depressed point that does not substantially move as a long pressed point, and records the depressed point in a memory. The touch operation determination unit 63 provides the pattern recognition unit 64 with the handwritten locus that represents an image of the travel route pattern from the handwritten locus recorded in a memory. The pattern recognition unit 64 uses a pattern recognition technology to extract the travel route pattern that agrees with the provided handwritten locus data from among the group of travel route patterns which are registered in advance and are stored in a memory 4M, and provides the extracted travel route pattern to the travel route generation unit 60 as the designated travel route pattern.

Upon determination that the handwritten locus recorded in a memory is likely to be a dividing line for the field (work field), the touch operation determination unit 63 provides data of the handwritten locus to the division data generation unit 65. Upon determination that the handwritten locus recorded in a memory is likely to be a long pressed point, the touch operation determination unit 63 provides data of the long pressed point to the initial point data generation unit 66.

Figure 4:
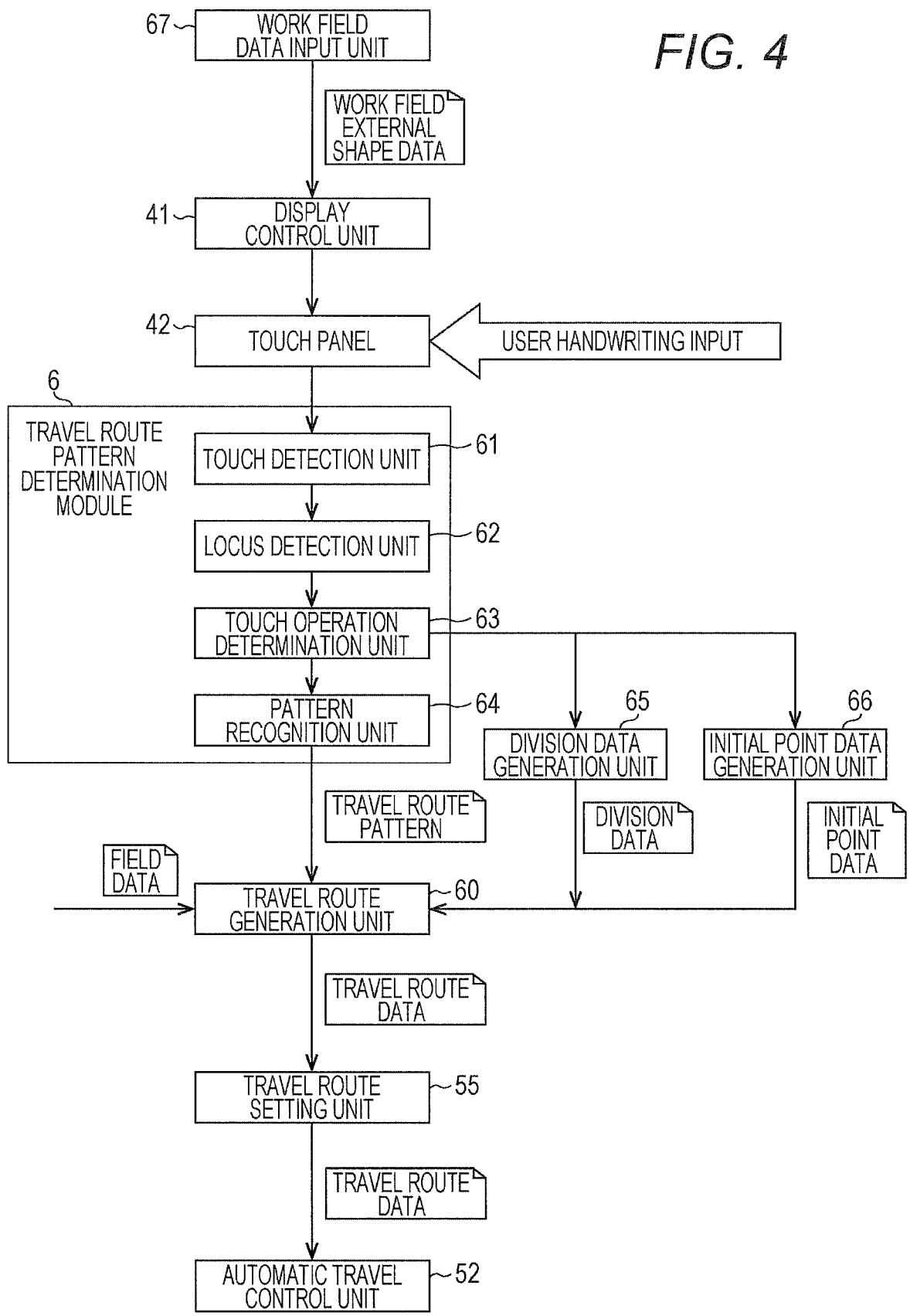
FIG. 4 is a data flowchart illustrating a data flow in the travel route generation apparatus.

Next, a travel route creation process flow in the travel route generation apparatus configured in the portable communication terminal 4 will be described with reference to FIG. 4.

The work field data input unit 67 extracts, from information on a field in which work will be performed from this time, external shape data of the field, and provides the extracted external shape data to the display control unit 41. On the basis of the received external shape data, the display control unit 41 displays a field external shape line that schematically indicates the external shape of the field on the display panel section of the touch panel 42. The user performs handwriting input of an image of a desired travel route pattern in traveling work to be performed from this time within the field external shape line. At that time, when the user wants to designate a starting point or entrance of the traveling work, the user can designate the position thereof by an operation form such as long press. In addition, when the user divides the field and performs traveling work in each divided work section, the user performs handwriting input of the dividing line for the field. The touch operation determination unit 63 determines which of the handwritten locus that indicates the image of the travel route pattern, the starting point, and the dividing line, the user's handwriting input is.

When a determination result of the user's handwriting input made by the touch operation determination unit 63 is the dividing line, data indicating the dividing line is read from a memory by the division data generation unit 65. On the basis of the read data, the division data generation unit 65 generates division data that divides the field, and provides the division data to the travel route generation unit 60. When the determination result of the user's handwriting input made by the touch operation determination unit 63 is the initial point (or entrance), data indicating the initial point (or entrance) is read by the initial point data generation unit 66. On the basis of the read data, the initial point data generation unit 66 generates initial point data that sets the initial point of the travel route, and provides the initial point data to the travel route generation unit 60.

When the determination result of the user's handwriting input made by the touch operation determination unit 63 is the handwritten locus indicating the image of the travel route pattern, the locus data is read by the pattern recognition unit 64. The pattern recognition unit 64 considers the read locus data to be input data of pattern recognition, and determines the designated travel route pattern.

Note that when the pattern recognition unit 64 is not able to determine one travel route pattern from the handwritten locus made by the user's handwriting input, it is also possible to determine a plurality of similar travel route patterns as a travel route pattern in correspondence, to display the plurality of travel route patterns on the display panel section of the touch panel 42, and to allow selection by the user.

Figure 5:
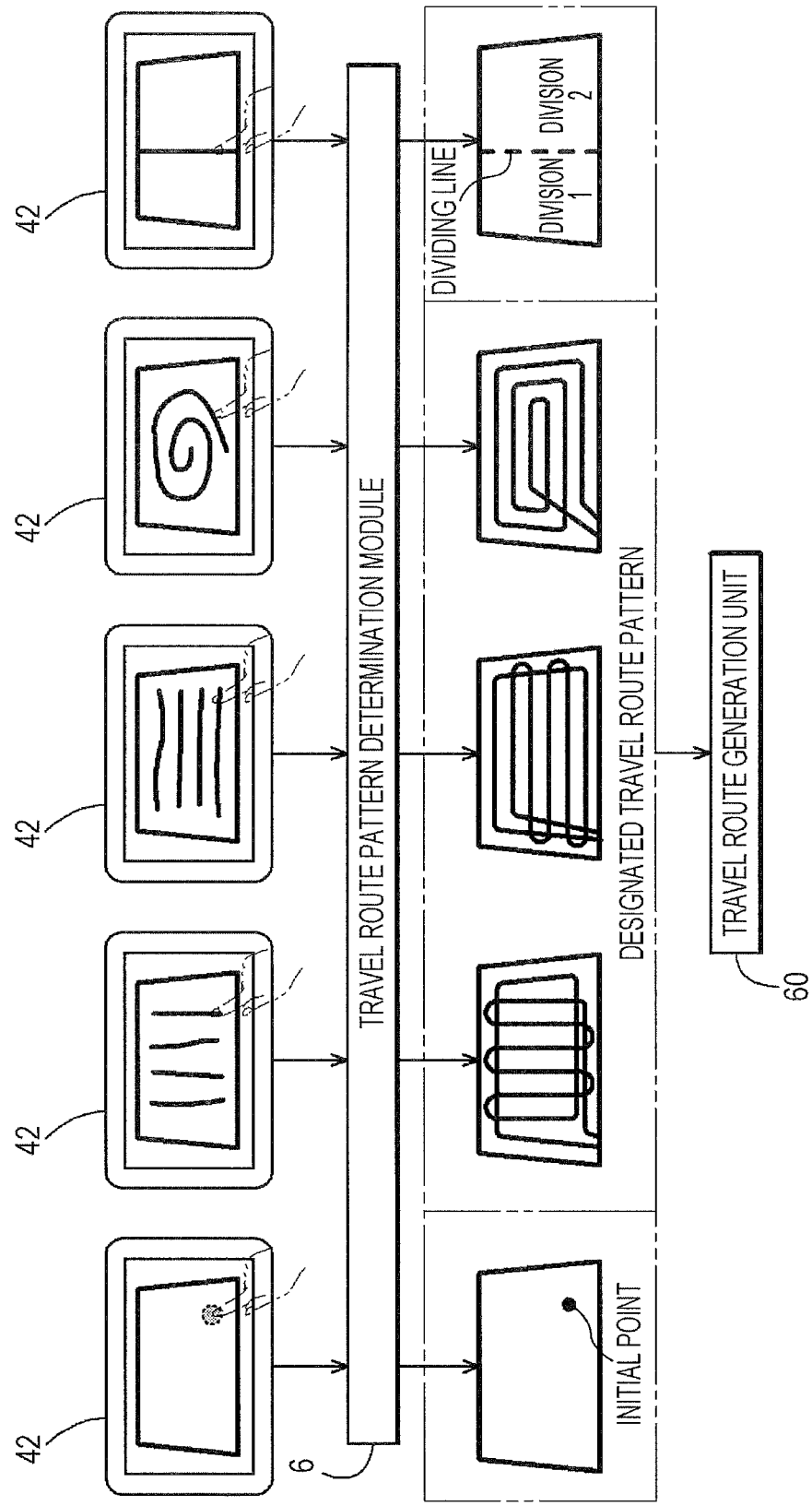
FIG. 5 is an illustrative diagram illustrating a handwriting input process in a travel route pattern determination module.

When the travel route pattern the user imagines is input by handwriting on the touch panel 42, as illustrated in FIG. 5, the travel route pattern determination module 6 provides the travel route generation unit 60 with the designated travel route pattern that is determined on the basis of the handwriting input. For example, travel patterns such as a lateral reciprocating straight movement travel pattern that is a combination of lateral straight movement and U-turn, a longitudinal reciprocating straight movement travel pattern that is a combination of longitudinal straight movement and U-turn, and a spiral travel pattern are provided to the travel route generation unit 60 as designated travel route patterns. Note that division of the field and the initial point of the travel route are processed by the division data generation unit 65 and the initial point data generation unit 66, respectively, and are provided to the travel route generation unit 60 as travel route generation auxiliary data. The travel route generation unit 60 has a travel route generation algorithm that is classified into each designated travel route pattern provided by the travel route pattern determination module 6. The travel route generation unit 60 generates the travel route on the basis of the provided designated travel route pattern, the external shape data, and the travel route generation auxiliary data. The generated travel route is transferred to the controlling unit 5 as a target travel route for traveling work of the tractor. In the controlling unit 5, when travel route data that indicates the travel route generated by the travel route generation unit 60 is transferred to a travel route setting unit 55, the travel route setting unit 55 sets this as a target travel route. During automatic traveling, an automatic travel control unit 52 generates an automatic steering instruction on the basis of this travel route data as the target travel route and the own position.

Figure 6:
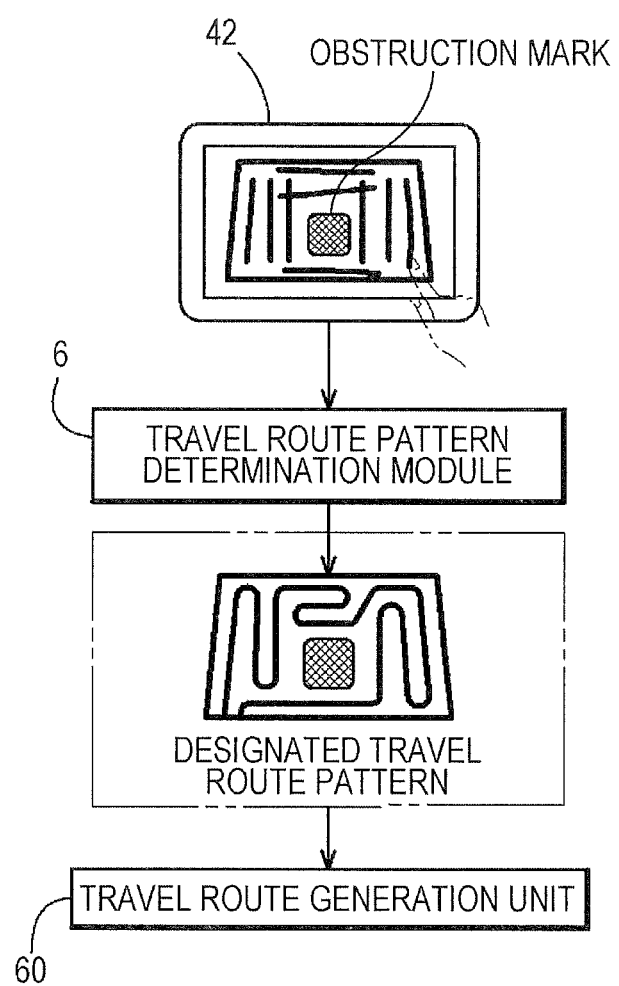
FIG. 6 is an illustrative diagram illustrating a handwriting input process of a travel route that avoids an obstruction for traveling.

In the above description, it is assumed that the field includes no obstruction for traveling, but an actual field sometimes includes various obstructions for traveling, such as water wells and power transmission towers. When such a known obstruction for traveling is included in information on the field, an obstruction mark indicating the obstruction for traveling can be displayed on the display panel section of the touch panel 42 together with the field external shape line. The obstruction mark may be changed in size according to a size of the obstruction for traveling. While the user performs handwriting input indicating the image of the travel route pattern, when the obstruction mark is included within the displayed field external shape line, as illustrated in FIG. 6, the user draws a rough travel route pattern that avoids the obstruction mark (obstruction for traveling). On the basis of the travel route locus including obstruction avoidance that is input by handwriting in this way, the travel route pattern determination module 6 determines the designated travel route pattern including the obstruction avoidance travel route. Since an accurate coordinate position of the obstruction for traveling is included in the information on the field, the travel route generation unit 60 can generate accurate travel route data including the obstruction avoidance travel route on the basis of the designated travel route pattern determined by the travel route pattern determination module 6.

Note that when the field information does not include data of the obstruction for traveling although the obstruction for traveling exists in the actual field, it is also possible to input by handwriting the data of the obstruction for traveling, such as the position and size, via the touch panel 42.

As illustrated in FIG. 3, the controlling unit 5, which is a core element of the control system of the tractor, includes an output processing unit 7 and an input processing unit 8 (a communicator), which respectively function as input and output interfaces, and a communication processing unit 70. The output processing unit 7 is coupled to devices equipped in the tractor, such as a group of vehicle travel devices 71, a group of work devices 72, and a notification device 73. The group of vehicle travel devices 71 includes the steering motor 14, and although not illustrated, devices to be controlled for allowing the vehicle to travel normally, such as a transmission mechanism and an engine unit. The group of work devices 72 includes devices such as a drive mechanism for the work device 30 and the lifting mechanism 31 that raises and lowers the work device 30. The notification device 73 includes a display, lamps, and a speaker. The display in particular displays various pieces of notification information, such as an already traveled travel route (travel locus) and a travel route that should be traveled from this time, together with the external shape of the field. The lamps and the speaker are used to notify the driver and the supervisor of attention information and warning information, such as travel precautions and deviation from the target travel route when the work vehicle is automatically steered. The communication processing unit 70 has a function of transmitting data processed by the controlling unit 5 to the control computer 100, and receiving various kinds of data from the control computer 100.

The input processing unit 8 is coupled to devices such as the satellite positioning module 80, a group of travel system detection sensors 81, a group of work system detection sensors 82, and an automatic/manual switch 83. The group of travel system detection sensors 81 includes sensors for detecting travel states such as an engine speed and a transmission state. The group of work system detection sensors 82 includes sensors for detecting a position and an inclination of the work device 30, sensors for detecting workloads, and the like. The automatic/manual switch 83 is a switch for selecting either an automatic travel mode for traveling with automatic steering or a manual steering mode for traveling with manual steering.

Furthermore, the controlling unit 5 includes a travel control unit 50, a work control unit 54, an own position calculation unit 53, the travel route setting unit 55, and a notification unit 56. Based on positioning data sent from the satellite positioning module 80, the own position calculation unit 53 calculates the own position. Since the automatic travel (automatic steering) mode and the manual travel (manual steering) mode both configured to be available in this tractor for traveling, the travel control unit 50 for controlling the group of vehicle travel devices 71 includes a manual travel control unit 51 and the automatic travel control unit 52. In accordance with operations of the driver, the manual travel control unit 51 controls the group of vehicle travel devices 71. The automatic travel control unit 52 calculates discrepancies in direction and position between the travel route that is set by the travel route setting unit 55 and the own position, and generates and outputs an automatic steering instruction to the steering motor 14 via the output processing unit 7. To control movement of the work device 30, the work control unit 54 provides control signals to the group of work devices 72. The notification unit 56 generates notification signals (display data and voice data) for notifying information necessary for the driver or the supervisor through the notification device 73 such as a display.

The travel route setting unit 55 receives the travel route generated by the travel route generation unit 60 via the communication processing unit 70 from the portable communication terminal 4, and sets the travel route as a target travel route. Since the travel route indicates a starting point, the tractor is driven to the starting point when work starts. After that, the tractor travels automatically or manually along the set travel route.

Other Exemplary Embodiments (1) When the group of travel system detection sensors 81 of the tractor includes an obstruction for traveling detection sensor, such as a laser radar (LIDAR), and the travel route generation unit 60 has a function of generating the obstruction avoidance travel route, it is also possible to input the obstruction avoidance travel route by handwriting via the touch panel 42, to determine the resulting obstruction avoidance travel route by the travel route pattern determination module 6, and to provide the obstruction avoidance travel route to the travel route generation unit 60. With such a configuration, even if an obstruction for traveling is detected during traveling, it is possible to avoid the obstruction for traveling through the obstruction avoidance travel route desired by the user. At that time, the obstruction avoidance travel route may be input by handwriting for each size of the obstruction for traveling so as to perform a different obstruction avoidance travel route based on the size of the obstruction for traveling.

(2) Hardware and programs in the diagram illustrated in FIG. 3 are classified mainly for purposes of description. Actually, each of the hardware and programs can be integrated with another hardware or other programs. Alternatively, each of the hardware and programs can be divided into pieces of hardware or a plurality of programs. For example, all or part of the travel route generation apparatus configured in the portable communication terminal 4 may be configured in the control computer 100 or the controlling unit 5 of the work vehicle.

(3) The tractor equipped with the rotary tilling machine as the work device 30 has been described as the work vehicle in the above-described exemplary embodiment. In addition to such a tractor, for example, the exemplary embodiment is applicable to agricultural vehicles including rice transplanters, fertilizer distributors, and combines.

(4) In the above embodiment, the group of travel route patterns stored in a memory 4M, which is preferably a non-volatile memory. However, the group of travel route patterns may be stored in a volatile memory 64M illustrated in FIG. 3. In this case, the pattern recognition unit 64 may download the group of the travel route patterns from a different computer (e.g. the control computer 100) via the communication control unit 40 (a travel route pattern input interface) and tentatively store it in the memory 64M for the pattern recognition technology.

INDUSTRIAL APPLICABILITY

The travel route generation apparatus according to the embodiment of the present invention is applicable to the work vehicle that works in the work field along the set travel route. Traveling along the travel route may be manual traveling, or may be automatic traveling.

According to one advantageous exemplary embodiment of the present invention, a travel route generation apparatus for generating a travel route for a work vehicle that works while traveling in a work field according to the embodiment of the present invention includes: a work field data input unit that inputs work field data including external shape data of the work field; a travel route generation unit that generates the travel route corresponding to a designated travel route pattern designated by a user, based on the designated travel route pattern and the external shape data; a touch panel that receives handwriting input of a travel route image made by the user; and a travel route pattern determination module that detects a handwritten locus from the handwriting input and provides the travel route generation unit with a travel route pattern in correspondence with the detected handwritten locus from among a group of travel route patterns, as the designated travel route pattern.

With this configuration, when a user who manages work with the work vehicle in the designated work field (such as a driver or a supervisor) draws a desired travel route image for the work vehicle by handwriting on the touch panel, a travel route pattern similar to the travel route image is selected from among the group of travel route patterns recorded in advance, and the travel route pattern is provided to the travel route generation unit as the designated travel route pattern designated by the user. On the basis of this designated travel route pattern, the travel route generation unit generates the travel route necessary for working in a work field region obtained from the external shape data of the work field. Therefore, the generated travel route agrees with the user's image. Moreover, the travel route image desired by the user can be input by rough handwriting, imposing only light input operation burden on the user.

The travel route the user imagines is affected by the external shape of the work field. Accordingly, it is important to clearly determine a positional relationship between the external shape of the work field and the travel route to imagine. Therefore, one advantageous exemplary embodiment of the present invention is configured, during the handwriting input, to display the work field external shape based on the external shape data of the work field on a display panel section of the touch panel. Since the travel route image can be handwritten on the external shape of the work field displayed on the touch panel, the travel route image can be input by handwriting without mistaking the positional relationship between the external shape of the work field and the travel route to imagine. Furthermore, when the work field data includes an obstruction that exists in the work field, a travel route that avoids the obstruction can be advantageously drawn.

According to another advantageous exemplary embodiment of the present invention, when a plurality of travel route patterns are determined from among the group of travel route patterns as travel route patterns in correspondence, the plurality of travel route patterns are displayed on the display panel section of the touch panel, and the designated travel route pattern is selectable by the user from among the plurality of travel route patterns. Accordingly, even when it is difficult to determine the travel route pattern from handwriting input, more secure selection is possible.

When the work field is large in area and complicated in shape, it is necessary to divide the work field into a plurality of regions and to work in each region with a separate travel route. In order to allow the travel route generation apparatus according to the embodiment of the present invention to be applicable even to such a situation, one advantageous exemplary embodiment of the present invention has a configuration in which a dividing line for dividing the work field into a plurality of work sections is designated by the handwriting input on the touch panel, and the designated travel route pattern is determined for each of the work sections. With this configuration, to begin with, since the work field is divided by the handwriting input of the dividing line that divides the work field, the designated travel route pattern can be determined for each divided work section by the handwriting input.

Since an initial point of a travel route is typically a position adjacent to an entrance, the initial point of the travel route is preferably set at the entrance by default. However, when there is a plurality of entrances, or when the user wants to set a specified position as the initial point of the travel route, the user needs to designate the initial point of the travel route. Therefore, one advantageous exemplary embodiment of the present invention has a configuration in which the initial point of the travel route is designated by the handwriting input on the touch panel. Such designation of the initial point can be input by a long pressing operation or the like on the touch panel as one form of the handwriting input on the touch panel.

In cases where this travel route generation apparatus is provided in the work vehicle or is configured in a communication terminal carried by a crew member of the work vehicle, when a current location of the work vehicle is set as the initial point of the travel route, the work vehicle can smoothly switch to traveling along the generated travel route. In order to achieve this, one advantageous exemplary embodiment of the present invention has a configuration in which a communication control unit that receives an own position of the work vehicle is provided, and the initial point of the travel route is set as the own position of the work vehicle.

Obviously, numerous modifications and variations of the present invention are possible in light of the above teachings. It is therefore to be understood that within the scope of the appended claims, the invention may be practiced otherwise than as specifically described herein.

What is claimed is:

1. A travel route generation apparatus comprising:
a work field data input interface via which work field data are to be input, the work field data including data regarding a shape of a work field in which an agricultural work vehicle is configured to move a work device, the work device being linked to the agricultural work vehicle;
a handwriting input interface via which a handwriting locus is to be input, the handwriting locus comprising successive movement of a depressed point on the handwriting input interface;
a memory to store travel route patterns; and
circuitry configured to
select a designated travel route pattern from the travel route patterns based on the handwriting locus, and generate, based on the designated travel route pattern, the work field data, and vehicle data, a travel route along which the agricultural work vehicle is to travel in the work field, the vehicle data including a width of the work device and a turning radius of the agricultural work vehicle equipped with the work device.

2. The travel route generation apparatus according to claim 1, wherein a work field external shape based on the data regarding the shape of the work field is displayed on a display when the handwriting locus is input.

3. The travel route generation apparatus according to claim 1, wherein the work field data includes an obstruction.

4. The travel route generation apparatus according to claim 1,
wherein, when possibly designated travel route patterns are selected from the travel route patterns, the possibly designated travel route patterns are displayed on a display, and
wherein the designated travel route pattern is selectable from the possibly designated travel route patterns.

5. The travel route generation apparatus according to claim 1,
wherein a handwriting input including the handwriting locus is to be input via the handwriting input interface, and
wherein the circuitry is configured to extract the handwriting locus from the handwriting input.

6. The travel route generation apparatus according to claim 5,
wherein a dividing line to divide the work field into work sections is to be input via the handwriting input interface, and
wherein the designated travel route pattern is detected in each of the work sections.

7. The travel route generation apparatus according to claim 1, wherein an initial point of the travel route is to be input via the handwriting input interface.

8. The travel route generation apparatus according to claim 1, further comprising:
a communicator to receive a position of the agricultural work vehicle, wherein an initial point of the travel route is set as the position of the agricultural work vehicle.

9. The travel route generation apparatus according to claim 1, comprising:
a touch panel having the handwriting input interface.

10. The travel route generation apparatus according to claim 9, wherein a work field external shape based on the external shape data of the work field is displayed on a display panel section of the touch panel when the user is inputting the handwriting locus.

11. The travel route generation apparatus according to claim 9,
wherein, when possibly designated travel patterns are selected from the travel route patterns, the possibly designated travel route patterns are displayed on a display panel section of the touch panel, and
wherein the designated travel route pattern is selectable from the possibly designated travel route patterns.

12. The travel route generation apparatus according to claim 1, wherein the circuitry is configured to select the designated travel route pattern from the travel route patterns via pattern recognition technology.

13. The travel route generation apparatus according to claim 1, further comprising:
a travel route pattern input interface via which the travel route patterns are inputted into the memory.

14. The travel route generation apparatus according to claim 13, wherein the memory is a volatile memory.

15. The travel route generation apparatus according to claim 1, wherein the memory is a non-volatile memory.

16. A method for generating a travel route, comprising:
inputting a handwriting locus comprising successive movement of a depressed point on a handwriting input interface;
selecting, based on the handwriting locus, a designated travel route pattern from travel route patterns stored in a memory; and
generating, based on the designated travel route pattern, work field data, and vehicle data, a travel route along which an agricultural work vehicle is to travel in a work field in which the agricultural work vehicle is configured to move a work device, the work device being linked to the agricultural work vehicle, the work field data including data regarding a shape of the work field, the vehicle data including a width of the work device and a turning radius of the agricultural work vehicle equipped with the work device.

17. A travel route generation apparatus comprising:
work field data input means via which work field data are to be input, the work field data including data regarding a shape of a work field in which an agricultural work vehicle is configured to move a work device, the work device being linked to the agricultural work vehicle;
handwriting input means via which a handwriting locus is to be input, the handwriting locus comprising successive movement of a depressed point on the handwriting input means;
storing means for storing travel route patterns;
pattern selecting means for selecting a designated travel route pattern among the travel route patterns based on the handwriting locus; and
travel route generating means for generating, based on the designated travel route pattern, the work field data, and vehicle data, a travel route along which the agricultural work vehicle is to travel in the work field, the vehicle data including a width of the work device and a turning radius of the agricultural work vehicle equipped with the work device.

18. The travel route generation apparatus according to claim 1, wherein the circuitry is configured to select the designated travel route pattern from the travel route patterns such that the designated travel route pattern is most similar to the handwriting locus among the travel route patterns.

* * * * *